(12) United States Patent
Lamp

(10) Patent No.: US 12,390,745 B2
(45) Date of Patent: Aug. 19, 2025

(54) PROCESS FOR PRODUCING WATER-RESISTANT FILMS FROM CORN GLUTEN MEAL

(71) Applicant: Traceless Materials GmbH, Hamburg (DE)

(72) Inventor: Anne Lamp, Hamburg (DE)

(73) Assignee: Traceless Materials GmbH, Hamburg (DE)

( * ) Notice: Subject to any disclaimer, the term of this patent is extended or adjusted under 35 U.S.C. 154(b) by 301 days.

(21) Appl. No.: 18/008,151

(22) PCT Filed: Jun. 9, 2020

(86) PCT No.: PCT/EP2020/065914
§ 371 (c)(1),
(2) Date: Dec. 2, 2022

(87) PCT Pub. No.: WO2021/249621
PCT Pub. Date: Dec. 16, 2021

(65) Prior Publication Data
US 2023/0271106 A1    Aug. 31, 2023

(51) Int. Cl.
*B01D 11/02* (2006.01)
*B01D 21/00* (2006.01)
(Continued)

(52) U.S. Cl.
CPC ...... *B01D 11/0284* (2013.01); *B01D 11/0257* (2013.01); *B01D 11/0292* (2013.01);
(Continued)

(58) Field of Classification Search
CPC ............ B01D 11/0284; B01D 11/0257; B01D 11/0292; B01D 9/0013; B01D 9/0054;
(Continued)

(56) References Cited

U.S. PATENT DOCUMENTS 1,966,604 A * 7/1934 Walsh ................. C09D 189/00
106/154.3
2,044,769 A * 6/1936 Buron ....................... A23J 3/14
264/DIG. 38
(Continued)

FOREIGN PATENT DOCUMENTS

CN    1302550 A    7/2001
CN    101024725 B    8/2007
(Continued)

OTHER PUBLICATIONS

Publication by John Lawton, Proceedings of International Starch Technology Conference, Peoria, IL, "New Uses of Corn Proteins", published Jun. 1, 2003. (Year: 2003).*
(Continued)

*Primary Examiner* — Joseph W Drodge
(74) *Attorney, Agent, or Firm* — 24IP Law Group USA, PLLC; Timothy R DeWitt

(57) ABSTRACT

The present invention primarily concerns a process for producing a plastic material, comprising the steps (i) providing a corn gluten source and a first liquid phase comprising an organic solvent; (ii) extracting solvent-soluble components of the corn gluten source into the first liquid phase; (iii) precipitating a first fraction of the solvent-soluble components out of the first liquid phase, resulting in a second solid phase including the first fraction of the solvent-soluble components and a second liquid phase including a second fraction of the solvent-soluble components; (iv) separating the second solid phase and the second liquid phase; and (v) recovering a flexible plastic material from the second liquid phase or recovering a hard plastic material from the second solid phase.

18 Claims, 4 Drawing Sheets

(51) Int. Cl.
*B29B 17/00* (2006.01)
*C08J 7/04* (2020.01)

(52) U.S. Cl.
CPC .............. *B01D 21/00* (2013.01); *B29B 17/00* (2013.01); *C08J 7/04* (2013.01); *C08J 2399/00* (2013.01)

(58) Field of Classification Search
CPC ... B01D 11/02; B01D 11/028; B01D 11/0288; B01D 17/00; B01D 17/005; B01D 21/00; B01D 21/26; B01D 21/262; C08J 7/04; C08J 2399/00; C08L 89/00; B29B 13/00; B29B 13/04; B29B 13/045; B29B 13/10; B29B 15/00; B29B 17/00; B29B 17/02; B29B 17/04; B29B 2013/002; B29B 2017/001; B29B 2017/0213; B29B 2017/0217; B29B 2017/0231; B29B 2017/0234
See application file for complete search history.

(56) References Cited

U.S. PATENT DOCUMENTS

| | | | | |
|---|---|---|---|---|
| 2,115,717 | A * | 5/1938 | Hansen | C08K 5/0016 106/156.1 |
| 2,206,819 | A * | 7/1940 | Martin | C09D 189/00 530/372 |
| 2,285,758 | A | 6/1942 | Sturken | |
| 2,360,081 | A * | 10/1944 | Stewart | C08K 5/053 106/154.11 |
| 5,324,351 | A | 6/1994 | Oshlack et al. | |
| 5,585,060 | A | 12/1996 | Takahashi et al. | |
| 6,635,206 | B1 | 10/2003 | Padua et al. | |
| 2004/0056388 | A1 * | 3/2004 | Padua | C08L 89/00 264/109 |
| 2006/0042506 | A1 * | 3/2006 | Woerdeman | C08L 89/00 106/125.1 |
| 2006/0147582 | A1 * | 7/2006 | Riebel | C12F 3/10 426/61 |

FOREIGN PATENT DOCUMENTS

| | | |
|---|---|---|
| CN | 103382255 B | 11/2013 |
| CN | 104397828 B | 3/2015 |
| EP | 0648078 B1 | 4/1995 |
| FR | 853632 A | 3/1940 |
| GB | 492599 A | 9/1938 |
| WO | 2016154441 A1 | 9/2016 |

OTHER PUBLICATIONS

Publication by David Sessa et al, "Zein-based polymers formed by modifications with isocyanates", published in Industrial Crops and Products, vol. 43, May 2013, pp. 106-113. (Year: 2013).*

Rishi Shukla, Munir Cheryan, "Zein: the industrial protein from corn", Industrial Crops and Products, Elsevier, NL, vol. 13, No. 3, Jan. 1, 2001 171-192.

* cited by examiner

PROCESS FOR PRODUCING WATER-RESISTANT FILMS FROM CORN GLUTEN MEAL

The present invention relates to the field of biopolymers, in particular bio-based and bio-degradable plastics. More specifically, the present invention primarily relates to a process for production of a plastic material from a corn gluten source.

Most plastics today are made from fossil raw materials and are not biodegradable. The resulting environmental problems from plastic pollution are well known. The reason for the lack of biodegradability of conventional plastics, but also of many bioplastics, is that they are polymerized synthetically from monomers. The microorganisms in the environment have only a limited ability to break down these synthetically produced polymer chains. An alternative is the use of polymers that already exist in nature, such as starch, cellulose, lignin or proteins, which can easily be degraded by nature's microorganisms.

To avoid conflict with food, these natural polymers should also be obtained from second-generation biomasses, such as residues from the agricultural industry. One example of such residues is corn gluten meal, a byproduct from starch production that is obtained by corn wet milling. Corn wet milling is a two-stage process that includes a steeping process to soften the corn kernel and a wet milling process step that results in purified starch and corn gluten meal. Corn gluten meal is currently used as animal feed. But the nutritional quality of corn gluten meal protein, namely zein, is poor due to the limiting amount of essential amino acids. Instead, corn gluten meal can be used as a feedstock for the production of bio-based, compostable and water-resistant films for use as a substitute for conventional plastic films.

The film-forming properties of zein are well known in the literature. Zein is the prolamin fraction of corn protein and is soluble in aqueous ethanol. Zein molecules have a hydrophobic surface and thus excellent intermolecular interaction properties and are at the same time water-repellent. They therefore have a high potential for material applications.

A production process to obtain purified and dried zein powder from corn is disclosed in WO 2016/154441 (A1) and EP 0 648 078 B1. The process is based on multiple extraction steps with 75 to 100% ethanol and subsequent solid liquid separation and drying of the liquid phase. The purification aims to remove all fatty acids and pigments. Purified zein is available on the market, although it has a relatively high market price due to the extensive purification.

Standard methods for producing films, resins or coatings from purified zein are known from U.S. Pat. No. 6,635,206 B1, CN 101024725 B, U.S. Pat. Nos. 5,585,060 A, 5,324,351 A, 2,285,758 A, CN 104397828 B, CN 1302550 A or CN 103382255 B. All these methods share the common concept that dry zein powder is mixed with aqueous ethanol and fatty acids (mainly oleic acid). The latter is required because purified zein is very brittle and the addition of plasticizers is necessary in order to form a flexible film or resin. The mixture is then either poured into cold water to precipitate a moldable resin or dried under vacuum under moderate temperatures to form a film.

A disadvantage of the known methods is that they are not economically feasible. This is because the methods rely on food crops such as corn or purified zein as starting material. Food crops are valuable resources and purified zein is costly. Moreover, the known methods rely on the addition of fatty acids as plasticizers, which once again increases the costs for the production of plastics from or via zein. For these reasons, there are no film products from corn, zein or corn gluten as plastic alternatives available on the market until today.

A primary problem to be solved by the present invention is the provision of a process for the production of a plastic material, which at least partially overcomes the aforementioned disadvantages. In particular, it is an aim to provide a simple process for producing bio-based and bio-degradable plastics, which process is economically feasible, in particular cheap and operable on a large scale.

This problem is solved by the subject-matter of claim 1. Further aspects and preferred embodiments of the present invention result from the following description, the appended examples and especially the appended further patent claims.

According to a first aspect of the present invention, a process for producing a plastic material comprises the steps:

(i) providing a first solid phase comprising a corn gluten source, and a first liquid phase comprising an organic solvent;

(ii) extracting solvent-soluble components of the corn gluten source from the first solid phase into the first liquid phase;

(iii) subjecting the first liquid phase to precipitation to provide a second solid phase including a fraction of the solvent-soluble components and a second liquid phase depleted in the fraction of the solvent-soluble components; and (iv) separating the second solid phase and the second liquid phase, (v) recovering a flexible plastic material from the second liquid phase or recovering a hard plastic material from the second solid phase.

The invention is based on the innovation of the inventor that plastic materials with different physicochemical properties can be formed from a single, cheap, biological waste product using simple process steps. The present invention thus reflects an integrated approach towards the production of different plastic materials. The plastic materials obtained by the process have desirable properties. In particular, the flexible plastic material has physicochemical and mechanical properties that render the material particularly suitable for being used as a flexible plastic film in packaging or as a coating. The hard plastic material resulting from the process can be used for packaging or single use products such as trays, cups, straws, cutlery etc.

A further advantage of the present invention is that a fully bio-based and biodegradable plastic material can be produced by the present invention. The plastic material can be completely based on the corn gluten source. This means, the corn gluten source contains all constituents that are needed for producing the plastic material having the advantageous properties described herein. It is thus generally not necessary to add external constituents, i.e. constituents that do not stem from the corn gluten source.

Another advantage of the invention thus includes the possibility to omit addition of an external plasticizer and yet obtain a plastic material with desirable properties. Accordingly, in certain embodiments of the invention, the amount of external plasticizers contained in the produced plastic material is less than 5% (w/w), preferably less than 2% (w/w), more preferably less than 1% (w/w), more preferably less than 0.5% (w/w), most preferably less than 0.1% (w/w), relative to the total weight of the plastic material. This shall however not be understood to exclude the possibility to adjust or fine-tune the properties by the addition of external plasticizers or other constituents in other embodiments of the invention.

Further aspects, embodiments and advantages of the present invention become apparent from the following detailed description, the examples, the figures and the claims, which follow after the brief description of the drawings.

Figure 1:
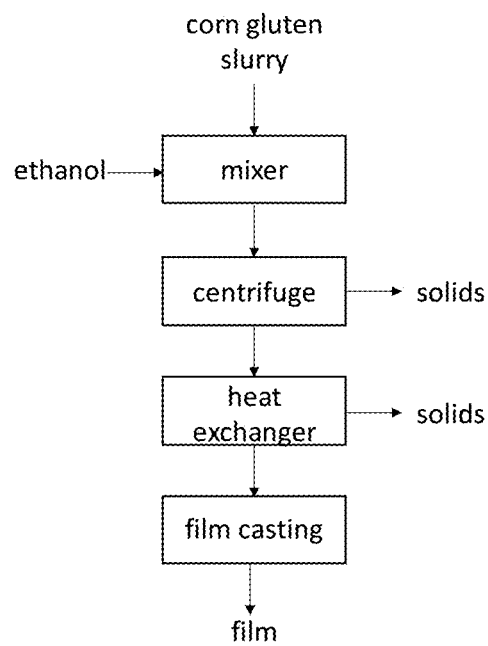
FIG. 1 illustrates a process according to a preferred embodiment of the present invention.

The process according to the present invention produces a plastic material with good physicochemical and mechanical properties from a corn gluten source. A plastic material as understood herein means a material that comprises all constituents required for being formed into a (flexible) plastic film, a (flexible) plastic coating or a (hard) plastic article. In some embodiments, all constituents of the plastic material stem from the corn gluten source and no external constituents are added. In some embodiments, the plastic material additionally comprises external constituents.

The term "flexible plastic material" denotes a plastic material that can be used as a flexible film or coating. In contrast, the term "hard plastic material" refers to a plastic material, which can be formed into a hard plastic article.

The first solid phase comprises a corn gluten source. A corn gluten source as defined herein is a source comprising corn gluten. In a preferred embodiment of the present invention, the corn gluten source is a slurry of corn gluten meal. The phrase "slurry of corn gluten" as understood herein denotes wet corn gluten. Wet corn gluten is obtainable when maize is used for starch extraction. When dried and optionally be milled, wet corn gluten yields corn gluten meal. Accordingly, the slurry of corn gluten is a common by-product of the manufacture of maize starch by wet-milling. It is further envisaged that the corn gluten slurry is treated prior to extraction. For example, a preferred corn gluten source is a corn gluten slurry that has been dried and optionally grinded prior to extraction.

The first liquid phase comprises an organic solvent. More specifically, the first liquid phase comprises at least one organic solvent. It may comprise a mixture of two or more organic solvents, or a mixture of at least one organic solvent and an aqueous solvent such as water. The amount and type of organic solvent(s), and optionally the amount and type of the aqueous solvent, are selected so that the resulting composition (i.e. the first liquid phase) is capable to serve as an extracting solvent for certain components of the corn gluten source (herein referred to as the solvent-soluble components).

The primary aim of the extraction of the solvent-soluble components is to obtain a liquid phase (herein referred to as the first liquid phase), which is enriched in plastic forming components, in particular in corn gluten proteins and lipids, and depleted in carbohydrates, lignin and minerals.

Accordingly, the first liquid phase is preferably selected based on its capability of dissolving corn gluten proteins, in particular zein, and corn gluten lipids, in particular corn gluten fatty acids. It is further preferred that the first liquid phase does not dissolve carbohydrates, lignin and minerals to a substantial extent.

In preferred embodiments, the organic solvent comprised in the first liquid phase is selected from the group consisting of aprotic polar organic solvents, protic organic solvents and mixtures thereof. Preferably, the organic solvent is selected from the group consisting of alcohol, ketones, and mixtures thereof. More preferably, the organic solvent is selected from the group consisting of monovalent alcohols containing 1 to 6, 1 to 5, 1 to 4, or 1 to 3 carbon atoms, and mixtures thereof. Most preferably, the organic solvent is selected from the group consisting of ethanol, isopropanol, and mixtures thereof.

According to one embodiment, the first liquid phase may be an aqueous phase comprising ethanol in an amount of 50 to 90%, preferably 55 to 85%, more preferably 60 to 80%, most preferably 65 to 75% (v/v). Thereby, it is ensured that the ethanol content is close to the optimum, which has been determined to be 70% (v/v).

According to another embodiment, the first liquid phase may be an aqueous phase comprising isopropanol in an amount of 40 to 80%, preferably 45 to 75%, more preferably 50 to 70%, most preferably 55 to 65% (v/v). The optimal isopropanol content has been determined to be 60% (v/v). The preferred ranges have thus been selected for being close to the optimal isopropanol content.

With respect to other solvents or solvent combinations that are useful in the context of the present invention, one may consider solvents having a similar log P value as ethanol, isopropanol, or as the resulting first liquid phase comprising ethanol or isopropanol in the above amount. Moreover, one may take into account the solvents' tendency of dissolving desired components, while not dissolving not desired components, as explained above.

As mentioned above, the solvent-soluble components of the corn gluten source are extracted from the first solid phase into the first liquid phase. The term "solvent-soluble components" denotes one or more components, which are soluble in the first liquid phase under the conditions applied during the extraction. The components comprise corn gluten proteins, preferably zein, and corn gluten lipids, preferably fatty acids. By extracting both corn gluten proteins and lipids, a flexible plastic material can be produced without having to add external fatty acids or another plasticizer to obtain the elasticity required for a plastic film.

The extraction may be carried out at ambient temperature, e.g. around 20° C. In preferred embodiments of the present invention, the extraction involves heating and/or mixing. Thereby, the process step can be accelerated, and its yield increased. For example, the extraction may be carried out at a temperature of at least 25° C., preferably at least 30° C., more preferably at least 40° C., more preferably at least 50° C., most preferably at least 55° C. In terms of power consumption, it may be advisable to limit the maximum temperature. Accordingly, the extraction is preferably carried out at a temperature of at most 90° C., preferably at most 80° C., more preferably at most 75° C., more preferably at most 70° C., most preferably at most 65° C.

The duration needed for extraction is not particularly limited and may generally range between 1 or several minutes, e.g. 5 minutes, and 24 hours.

Before subjecting the first liquid phase to precipitation, the first solid phase and the first liquid phase are separated. This can be achieved by removing the first solid phase (including solvent-non-soluble components of the corn gluten source) from the first liquid phase by solid-liquid separation, preferably by centrifugation, filtration, decantation, sedimentation or a combination thereof.

The purpose of the precipitation step, which follows thereafter is to adjust the composition, in particular the amount of the corn gluten proteins relative to the amount of the corn gluten lipids, so that a plastic material with the desired properties can be recovered. The higher the ratio of the corn gluten lipid content to the corn gluten protein content in the recovered plastic material, the higher its elasticity, and vice versa. Depending on the desired properties, the conditions are altered so that the solubility limit of certain solvent-soluble components is exceeded and a fraction of the solvent-soluble components precipitates, forming the second solid phase. The remaining liquid, i.e. the second liquid phase, contains an accordingly depleted content of solvent-soluble components.

According to a preferred embodiment of the invention, the precipitation in step (iii) involves cooling of the first liquid phase (also referred to herein as cold precipitation). As a result of the cold precipitation, a flexible plastic material can be recovered from the second liquid phase. It is believed that cooling results in conditions that lead to precipitation of small amounts of the solvent-soluble components. Further, the conditions are believed to favor precipitation of the corn gluten protein over the corn gluten lipid so that the ratio of the corn gluten protein amount to the corn gluten lipid amount in the second liquid phase is decreased as compared to the ratio in the first liquid phase. In this way, the remaining lipid concentration is relatively high to yield an elastic plastic material.

Suitable cooling temperatures can be readily determined by a person skilled in the art. Preferably, the cooling results in a temperature drop of the first liquid phase of at least 5° C., preferably at least 10° C., more preferably at least 15° C., at least 20° C., at least 25° C., at least 30° C., at least 35° C., at least 40° C., and most preferably at least 45° C. Preferably, the cooling results in a temperature of the first liquid phase of 5° C. or less, preferably 0° C. or less, more preferably −10° C. or less, most preferably −20° C. or less.

The duration needed for cold precipitation is not particularly limited and may generally range between several minutes and several hours, for instance between 15 minutes and 32 hours.

In another preferred embodiment of the invention, the precipitation in step (iii) involves addition of an aqueous phase to the first liquid phase (also referred to herein as water precipitation). As a result, a hard plastic material can be recovered from the second solid phase. It is believed that addition of the aqueous phase results in conditions that lead to precipitation of rather high amounts of the solvent-soluble components. Further, the corn gluten proteins and the corn gluten lipids precipitate to a similar extent so that no enrichment of the corn gluten lipids is achieved in the second solid phase. In this way, the remaining lipid concentration is relatively low to yield a hard plastic material.

The amount of the aqueous phase required for water precipitation can be determined by routine experiments. Preferred amounts result in a final water concentration of 75% to 95% (v/v). This range lies close to the optimal content of 85% (v/v) and thus facilitates high yields.

The temperature during water precipitation is not particularly limited and may range from −5° C. to 40° C., preferably 0° C. and 30° C., more preferably 5° C. and 25° C., most preferably 10° C. to 20° C.

Thereafter, the second solid phase and the second liquid phase are separated. This can be achieved by solid-liquid separation, preferably centrifugation, filtration, decantation, sedimentation or a combination thereof.

After separation of the second solid phase and the second liquid phase, a flexible plastic material can thus be recovered from the second liquid phase, or a hard plastic material can be recovered from the second solid phase. As mentioned above, if it is intended to produce a flexible plastic material, a material with best properties is obtained when cold precipitation is carried out as the precipitation step. If a hard plastic material is to be produced, the best results are obtained when water precipitation is performed as the precipitation step. Afterwards, the plastic material can be further processed to yield a flexible plastic film, a plastic coating or a hard plastic article as disclosed herein.

Another aspect of the present invention pertains to a process for producing a plastic film, a plastic coating, or a hard plastic article, comprising the steps of providing a plastic material by a process as disclosed herein and forming the plastic material into the plastic film, the plastic coating, or the hard plastic article. The plastic film can be obtained by directly casting the plastic material into a film, or by molding the plastic material and rolling the mold into a film. The plastic coating can be obtained via spray coating. The hard plastic article can be obtained via molding, extrusion or extrusion molding.

A further aspect relates to an apparatus for producing a plastic material. The apparatus comprises:
  (i) a container for storing a corn gluten source and a container for storing an organic solvent;
  (ii) an extraction unit for extracting solvent-soluble components of the corn gluten source into a first liquid phase;
  (iii) a precipitation unit for precipitating a first fraction of the solvent-soluble components out of the first liquid phase, resulting in a second solid phase including the first fraction of the solvent-soluble components and a second liquid phase with a second fraction of the solvent-soluble components;
  (iv) a separation unit for separating the second solid phase and the second liquid phase; and
  (v) optionally a drying unit for drying the second solid phase or the second liquid phase.

The various features and embodiments described in the context of the methods of the invention shall be understood to define corresponding features and embodiment of the apparatus of the invention, and vice versa.

Figure 7:
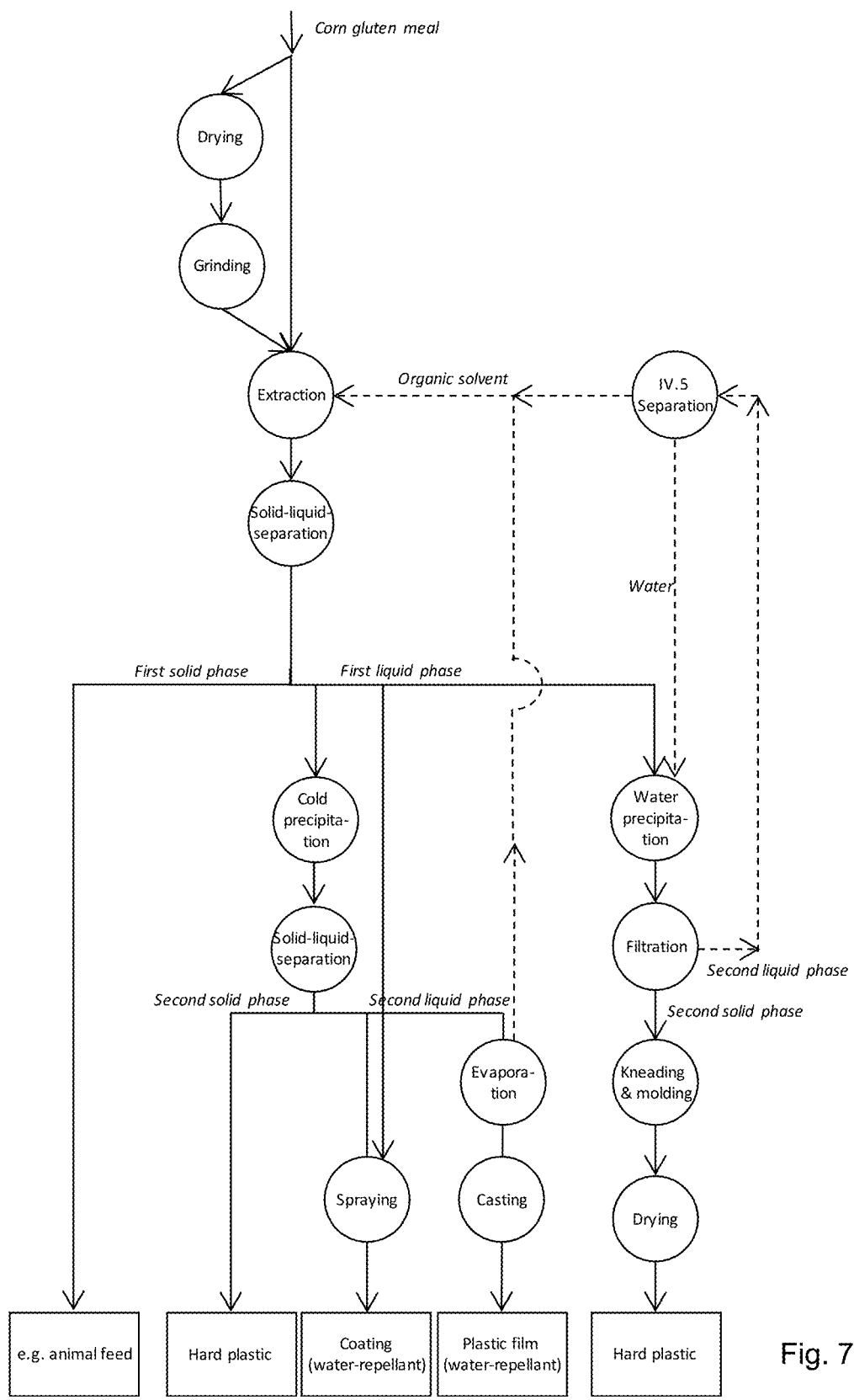
FIG. 7 illustrates a process scheme of an integrated process for the production of different plastics according to another embodiment of the present invention.

Further embodiments of the present invention are described with reference to the process scheme shown in FIG. 7. FIG. 7 illustrates an integrated process for the production of different plastics. The process may start with a slurry of corn gluten meal as the corn gluten source. The slurry may then be dried and grinded before the extraction is carried out. By combining the corn gluten source with a first liquid phase comprising an organic solvent, solvent-soluble components of the corn gluten source are extracted into the first liquid phase. The first liquid phase may then be separated from the solids (herein referred to as the first solid phase) by centrifugation. The solids may be removed from the process and used as feedstuff for animals or the like. The first liquid phase is further processed.

A precipitation step is carried out next. Depending on whether a cold precipitation or a water precipitation is carried out, the subsequent steps may differ.

Cold precipitation results in formation of solids (herein referred to as the second solid phase) and a liquid phase (herein referred to as the second liquid phase), whereas the second liquid phase is recovered to give a flexible plastic material. For this purpose, the second solid phase and the second liquid may be separated by centrifugation, and the second liquid phase may be used in spray coating techniques to give a water-repellant coating. Alternatively, the second liquid phase can be casted and dried to give a flexible plastic film, which is water-repellant and weldable. Organic solvent evaporated during the casting can be recycled and added to the extraction step, as shown by the left dotted recycling line in FIG. 7.

Water precipitation likewise results in formation of a second solid phase and a second liquid phase, however, the second solid phase is recovered to give a hard plastic material. For this purpose, the second solid phase may be removed from the second liquid phase by filtration, kneaded and dried. The removed second liquid phase may be recycled. The organic solvent may be separated from water by evaporation and added to the extraction step, as shown by the right dotted recycling line in FIG. 7. The water may be used in the water precipitation step.

In the following, the invention is explained in more detail by means of selected examples.

EXAMPLE 1

Corn gluten slurry was obtained from a starch production plant. The slurry was prepared by mechanical starch separation from corn.

The corn gluten slurry was then mixed with ethanol to obtain a final ethanol concentration of 70% (v/v). The mixture was heated to 50° C. and then stirred at 50° C. for one hour. Afterwards, solids were removed without cooling by centrifugation for 5 min at 5000×g. The recovered supernatant was cooled to −18° C. and then left at −18° C. for four hours. The formed precipitated solids were removed by centrifugation at 4° C. for 5 min at 5000×g. The recovered supernatant was poured in a casting form and dried at room temperature (18 to 25° C.) to form a 100 μm film. The process steps involved in example 1 are illustrated in FIG. 1.

Figure 2:
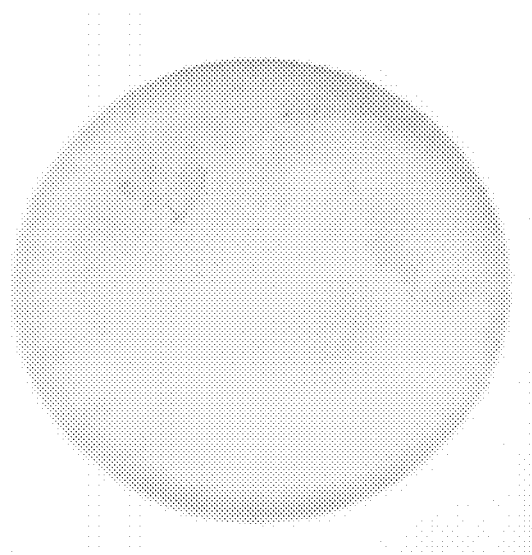
FIG. 2 shows a photo of a flexible film obtained by the process shown in FIG. 1.

The obtained film was found to be homogeneous and flexible. A photograph of the film is shown in FIG. 2.

EXAMPLE 2

Figure 3:
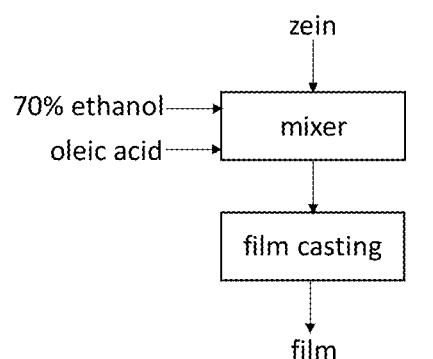
FIG. 3 illustrates a state-of-the-art process.

Commercial zein was dissolved in 70% ethanol (v/v). Then oleic acid was added to the solution in a concentration of 12% relative to the dry matter content in the mixture. The obtained solution was stirred for one hour and then poured in a casting form and dried at room temperature to form a 100 μm film. The process steps involved in example 2 are illustrated in FIG. 3.

The formed film was found to be relatively brittle.

EXAMPLE 3

Figure 4:
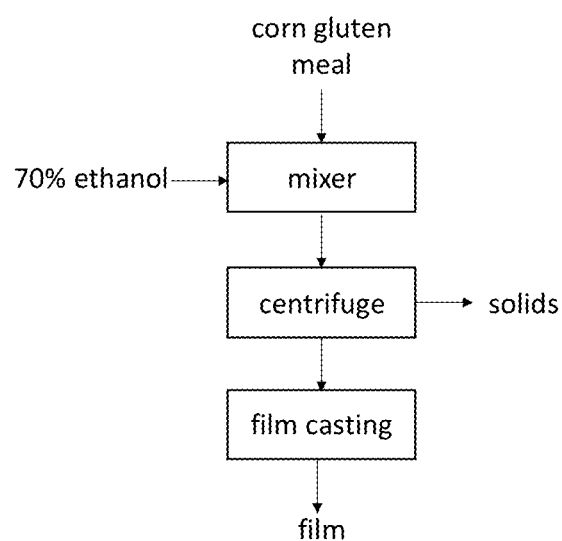
FIG. 4 illustrates another state-of-the-art process.

Corn gluten meal was mixed with ethanol to obtain a final ethanol concentration of 70% (v/v). The mixture was heated to 50° C. and then stirred at 50° C. for one hour. Afterwards, solids were removed without cooling by centrifugation for 5 min at 5000×g. The supernatant was poured in a casting form and dried at room temperature to form a 100 μm film. The process steps involved in example 3 are illustrated in FIG. 4.

Figure 5:
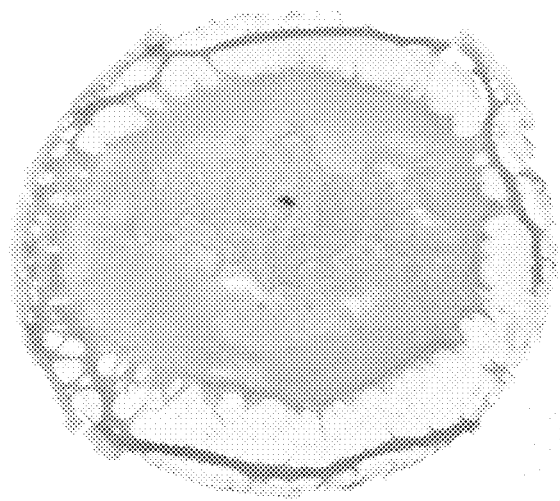
FIG. 5 shows a photo of a plastic film obtained by the process shown in FIG. 4.

The formed film was found to be inhomogeneous and brittle. A photograph of the film is shown in FIG. 5.

EXAMPLE 4

The process outlined in example 1 was performed with an extraction temperature of 25° C. instead of 50° C. The obtained film was found to be flexible.

EXAMPLE 5

The process outlined in example 1 was performed with isopropanol in a final concentration of 60% (v/v) instead of ethanol. The obtained film was found to be flexible.

EXAMPLE 6

The process outlined in example 1 was performed with a cooling temperature of 2° C. instead of −20° C. The obtained film was found to be flexible.

EXAMPLE 7

The process outlined in example 1 was performed with a film drying temperature of 30° C. instead of 20° C. The obtained film was found to be flexible.

EXAMPLE 8

The process outlined in example 1 was performed with an additional drying step of the corn gluten slurry at 80° C. prior to the extraction. The obtained film was found to be flexible.

EXAMPLE 9

Two further experiments were performed following the protocol described in example 1 with the difference that the supernatant in the casting form was dried at 30° C. and 40° C., respectively. As a result, comparable results were obtained.

EXAMPLE 10

Another experiment was performed following the protocol described in example 1 with the difference that the mixture of corn gluten slurry and ethanol was heated to 60° C. instead of 50° C. The yield was found to be higher. The obtained film had comparable properties.

EXAMPLE 11

The films obtained in examples 1 to 8 were subjected to mechanical parameter testing. The results of the testing are summarized in Table 1 below.

TABLE 1

Tensile strength and elongation at break for the films obtained with examples 1 to 8.

| Example | 1 | 2 | 3 | 4 | 5 | 6 | 7 | 8 |
|---|---|---|---|---|---|---|---|---|
| Tensile Strength (MPa) | 15 | 0 | 0 | 15 | 13 | 15 | 22 | 5 |

TABLE 1-continued

Tensile strength and elongation at break for the films obtained with examples 1 to 8.

| Example | 1 | 2 | 3 | 4 | 5 | 6 | 7 | 8 |
|---|---|---|---|---|---|---|---|---|
| Elongation at break (%) | 2.8 | 0 | 0 | 2.8 | 2.5 | 1.5 | 3.3 | 40 |
| Homogeneity | Yes | Yes | No | Yes | Yes | Yes | Yes | Yes |

EXAMPLE 12

Figure 6:
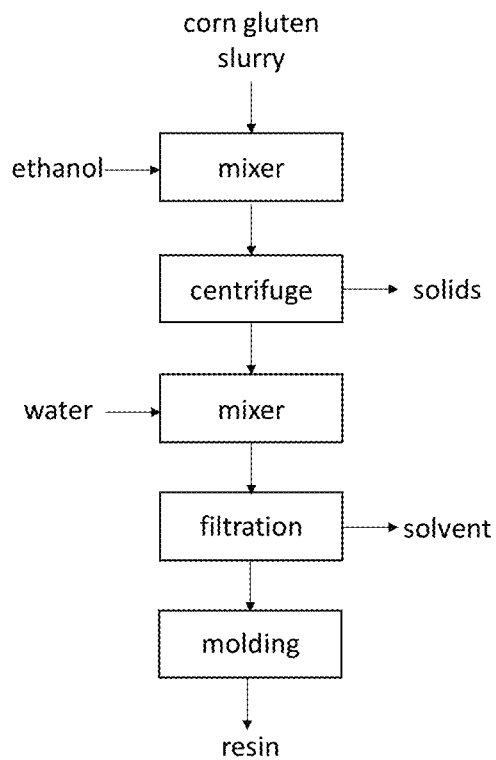
FIG. 6 illustrates a process according to another preferred embodiment of the present invention.

Corn gluten slurry was obtained from a starch production plant. The slurry was prepared by mechanical starch separation from corn. The slurry was mixed with ethanol to obtain a final ethanol concentration of 70% (v/v). The mixture was heated to 50° C. and then stirred at 50° C. for one hour. Afterwards, solids were removed without cooling by centrifugation for 5 min at 5000×g. The supernatant was poured into cold water at 15° C. in a volumetric ratio of 4:1 water:ethanol under stirring. The precipitate was separated from the solvent by filtration (paper filter) and kneaded to a homogeneous mass. The mass was kneaded and injected into a mould to form a stable resin. The process steps involved in example 12 are illustrated in FIG. 6.

CONCLUSION

A comparison of example 1 with example 3 shows that the process according to an embodiment of the present invention significantly improves the film quality achieved as compared to a state of the art film casting process. The film obtained by the embodiment has a significantly higher elongation at break and therefore is significantly more flexible, which renders it suitable for use as packaging material. The comparison between examples 1 and 2 shows that the film quality obtained by the embodiment according to the present invention is even better with regard to elongation at break than the film obtained by the state of the art process based on mixing commercial zein with fatty acids. Furthermore, the use of corn gluten is significantly cheaper than the use of purified zein and fatty acids, so the present invention makes the production of plastic packaging on an industrial scale economically feasible.

The invention claimed is:

1. A process for producing a plastic material, comprising the steps:
   i) providing a corn gluten source as a first solid phase and a first liquid phase comprising an organic solvent;
   (ii) extracting solvent-soluble components of the corn gluten source into the first liquid phase;
   (iii) precipitating a first fraction of the solvent-soluble components out of the first liquid phase, involving cooling of the first liquid phase, resulting in a second solid phase including the first fraction of the solvent-soluble components and a second liquid phase including a second fraction of the solvent-soluble components;
   (iv) separating the second solid phase and the second liquid phase; and
   (v) recovering a flexible plastic material from the second liquid phase or recovering a hard plastic material from the second solid phase,
   wherein the process is performed without addition of plasticizer external to the source or with addition of less than 5% plasticizer external to the source relative to the total weight of the plastic material being recovered.

2. The process of claim 1, wherein the solvent-soluble components of the corn gluten source include corn gluten proteins and lipids.

3. The process of claim 1, wherein the step of precipitating a first fraction of the solvent-soluble components out of the first liquid phase involves cooling of the first liquid phase.

4. The process of claim 3, wherein the cooling results in a temperature drop of the first liquid phase of at least 5° C. and/or wherein the cooling results in a temperature of the first liquid phase of 5° C. or less.

5. The process of claim 1, wherein the precipitating involves addition of an aqueous phase.

6. The process of claim 5, wherein the aqueous phase is added to yield a resulting water concentration of 75% to 95% (v/v).

7. The process of claim 1, wherein the organic solvent is selected from the group consisting of aprotic polar organic solvents, protic organic solvents and mixtures thereof.

8. The process of claim 1, wherein the first liquid phase comprises ethanol in an amount of 50 to 90%.

9. The process of any of claim 1, wherein the first liquid phase comprises isopropanol in an amount of 40 to 80%.

10. The process of claim 1, wherein the step of extracting solvent-soluble components of the corn gluten source into the first liquid phase involves heating and/or mixing.

11. The process of claim 1, wherein the step of extracting solvent-soluble components of the corn gluten source into the first liquid phase is carried out at a temperature of at least 20° C. and/or the extracting is carried out at a temperature of at most 90° C.

12. The process of claim 1, wherein the corn gluten source is a corn gluten slurry, optionally having being dried.

13. A process of forming a flexible plastic film, a plastic coating, or a hard plastic, comprising the steps of providing a flexible plastic film material, a plastic coating material, or a hard plastic material by the process steps of claim 1 and additionally performing the step of forming the flexible plastic film, the plastic coating, or the hard plastic therefrom.

14. The process of claim 13, wherein the step of forming the flexible plastic film, the plastic coating, or the hard plastic therefrom involves one of the following:
   obtaining a flexible plastic film by directly casting the plastic material into a film, or by molding the plastic material and rolling the mold into a film;
   obtaining a plastic coating by spray coating; or
   obtaining a hard plastic article by molding, extrusion or extrusion molding.

15. The process of claim 3, wherein the cooling results in a temperature of the first liquid phase of 0° C. or less.

16. The process of claim 1, wherein the organic solvent is selected from the group consisting of alcohol, ketones, and mixtures thereof.

17. The process of claim 16, wherein the organic solvent is selected from the group consisting of monovalent alcohols containing 1 to 6 carbon atoms.

18. The process of claim 12, wherein the corn gluten source is a dried corn gluten slurry.

* * * * *